Nov. 17, 1931.  B. S. SUMMERS  1,831,978
FIBER DRIER
Filed May 29, 1929  7 Sheets-Sheet 1
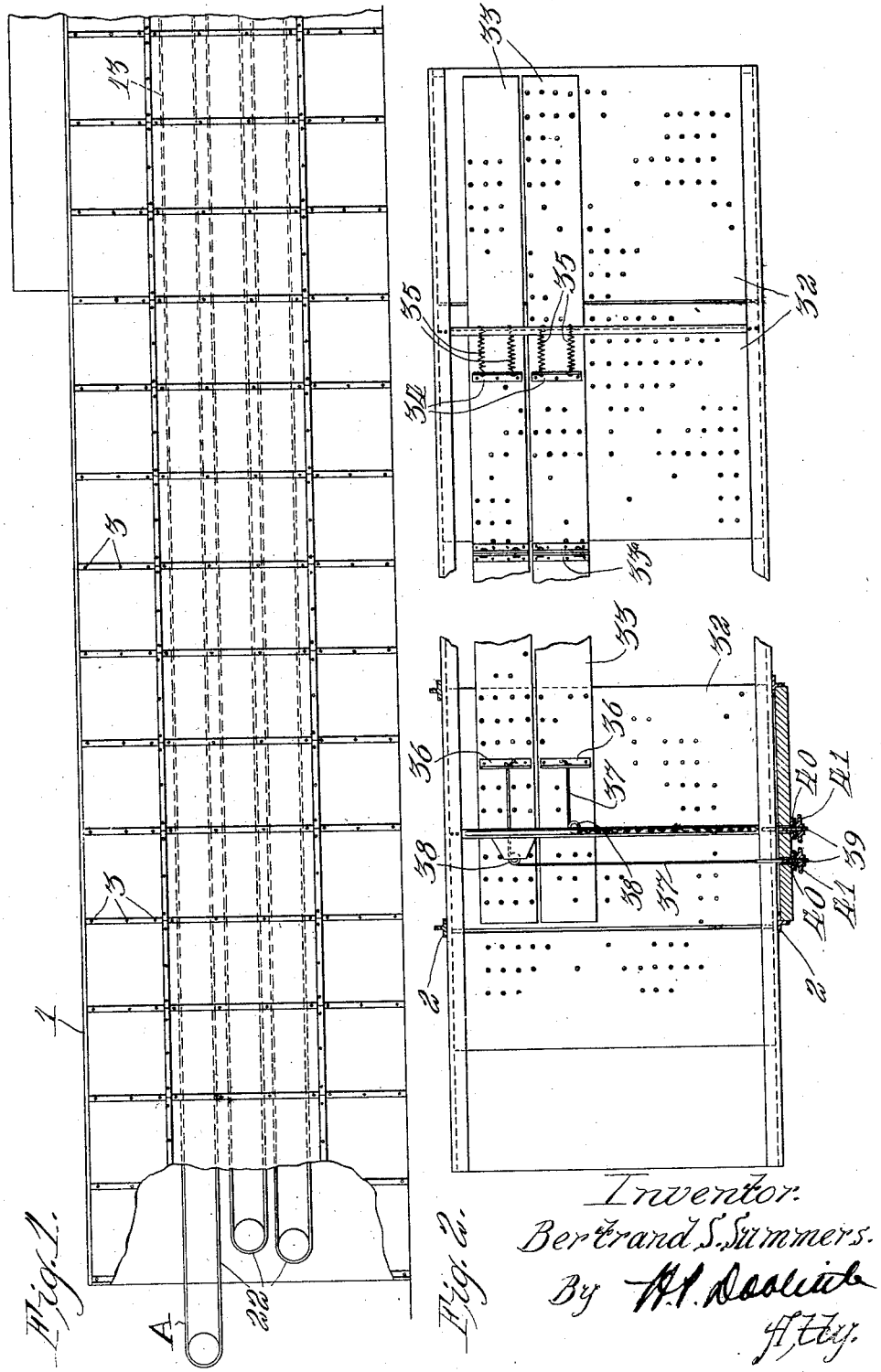

Nov. 17, 1931.  B. S. SUMMERS  1,831,978
FIBER DRIER
Filed May 29, 1929  7 Sheets-Sheet 2
Fig. 3.
Fig. 3ª
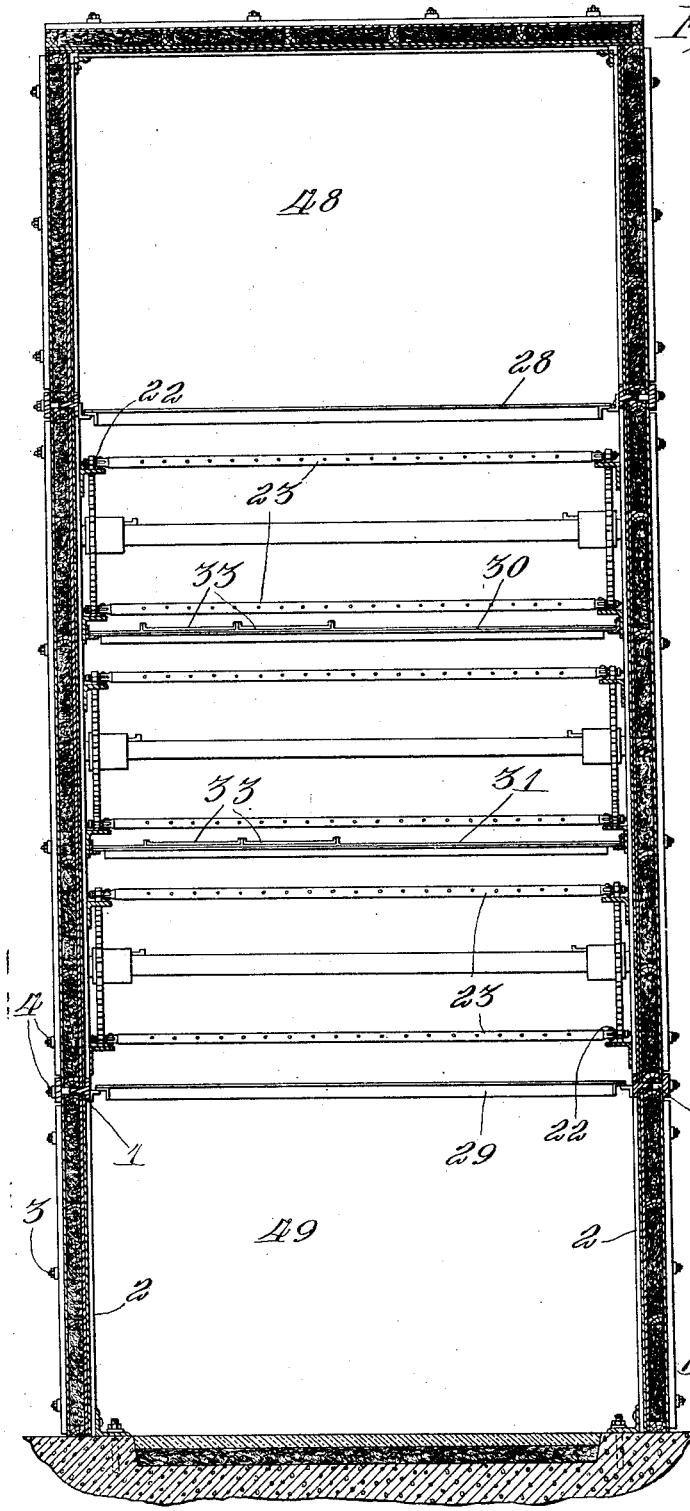
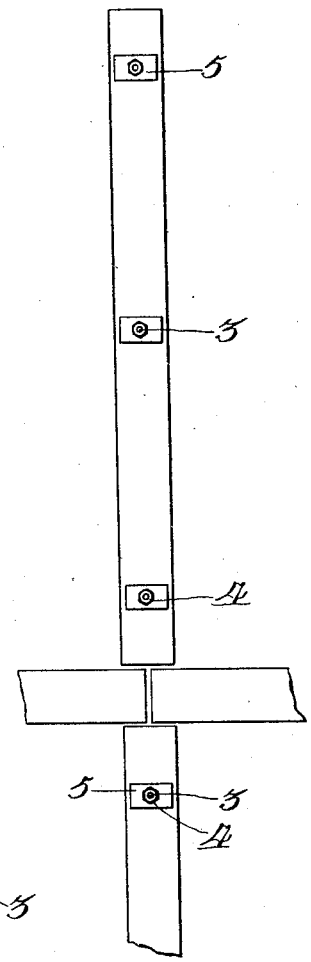
Inventor.
Bertrand S. Summers.
By W.P. Doolittle
Atty.

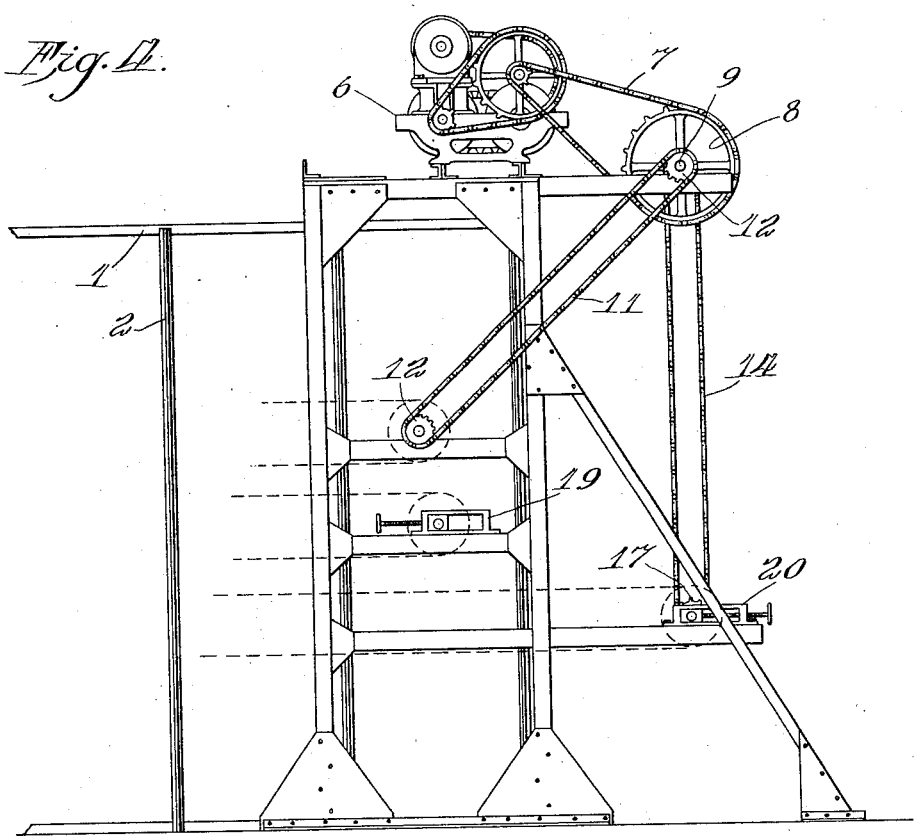
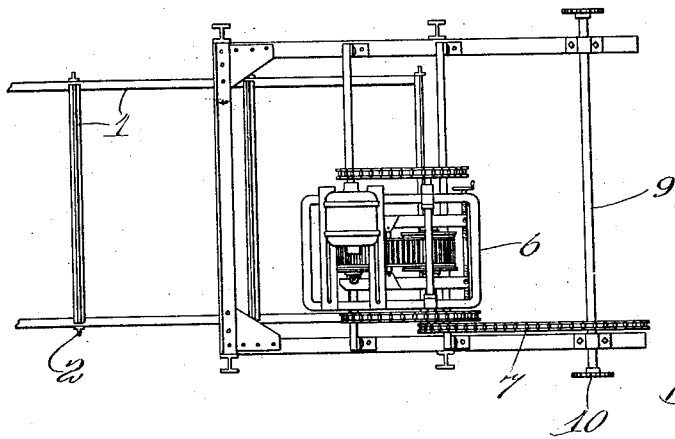

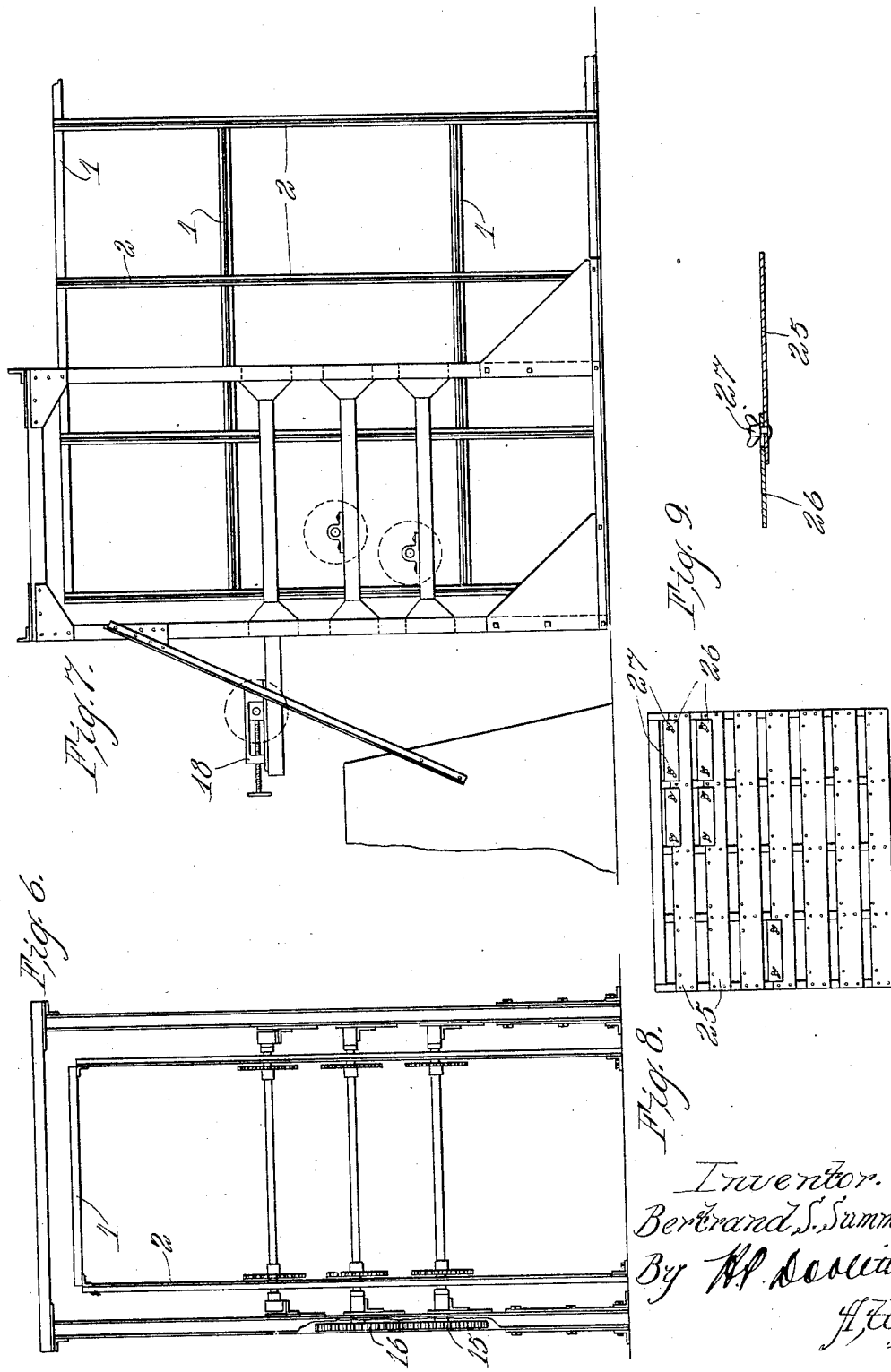

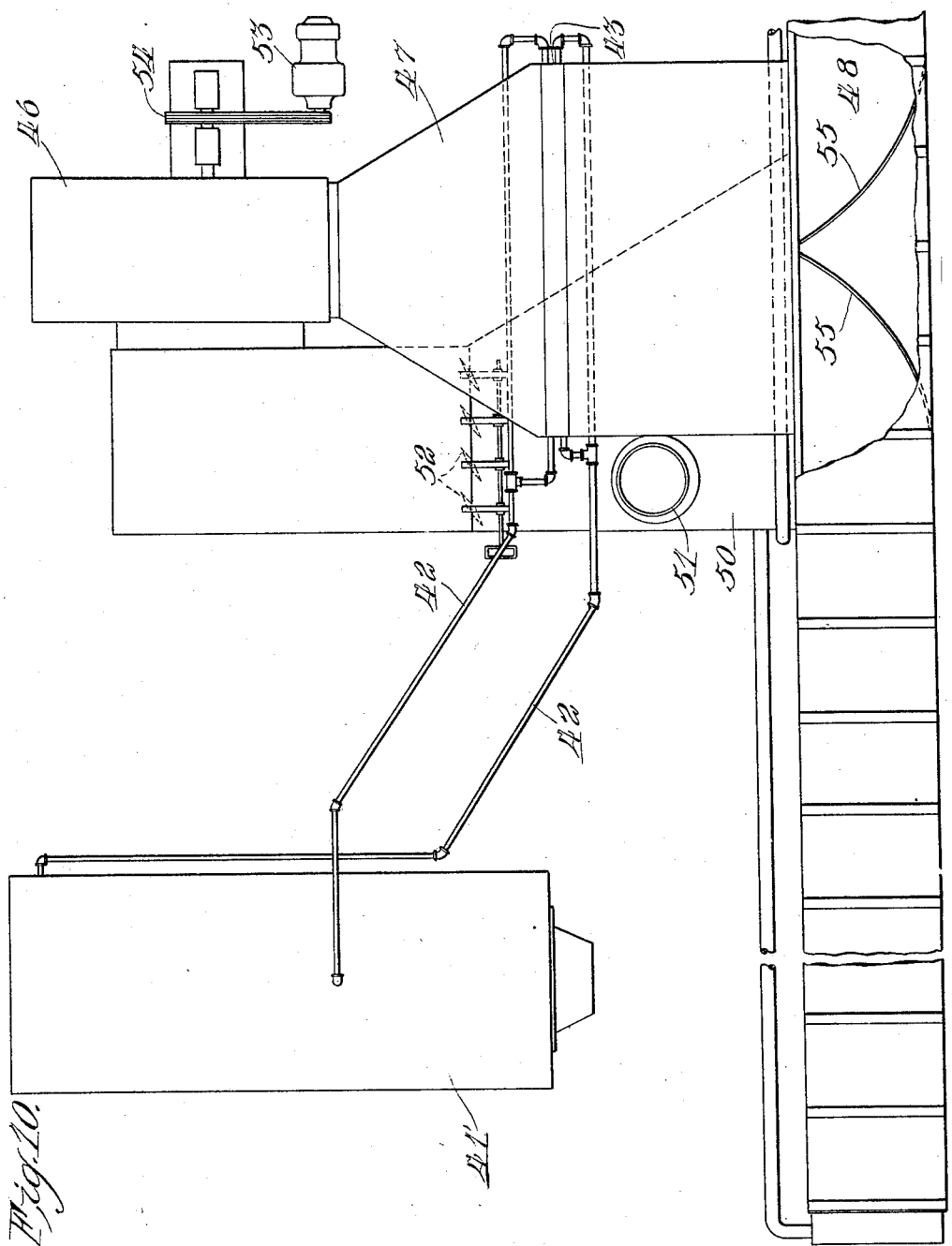

Nov. 17, 1931.  B. S. SUMMERS  1,831,978
FIBER DRIER
Filed May 29, 1929  7 Sheets-Sheet 6
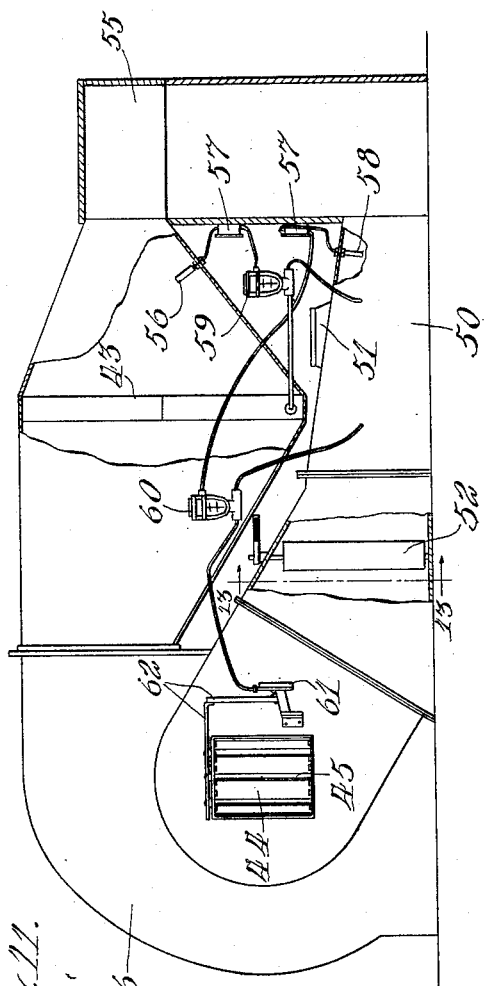
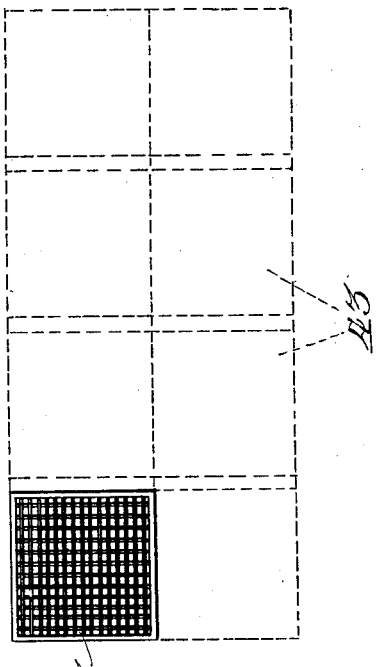
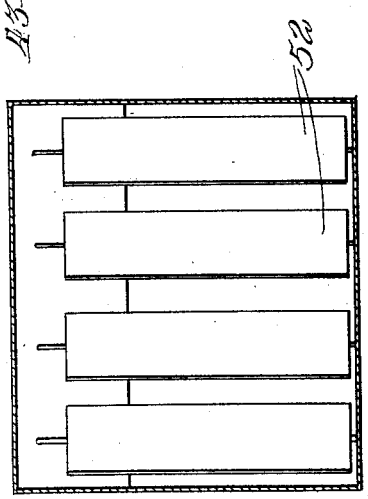
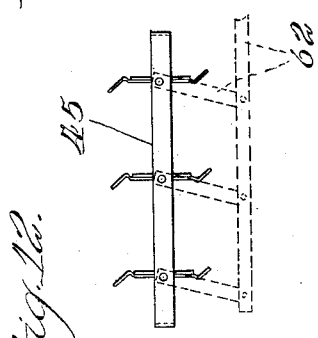
Inventor.
Bertrand S. Summers.
By [signature]
Atty.

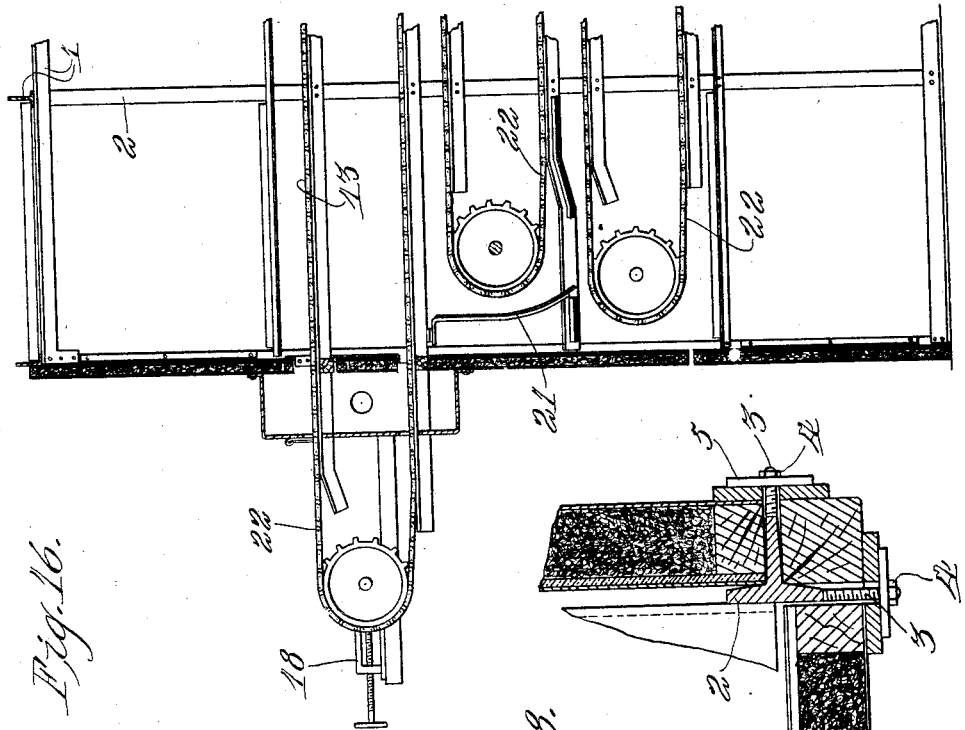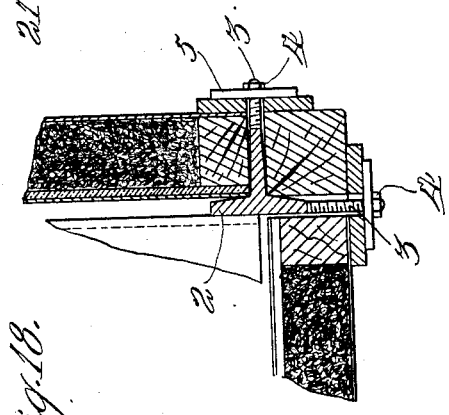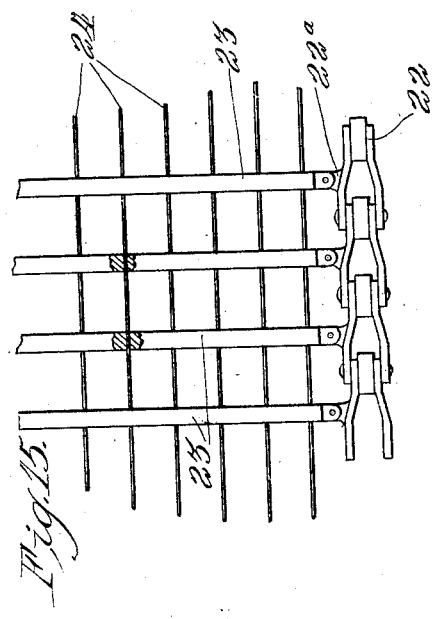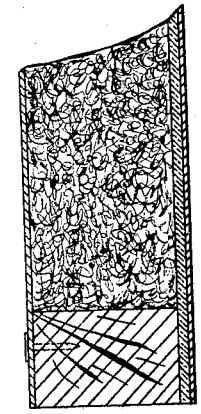

Patented Nov. 17, 1931

1,831,978

UNITED STATES PATENT OFFICE

BERTRAND S. SUMMERS, OF EVANSTON, ILLINOIS

FIBER DRIER

Application filed May 29, 1929. Serial No. 366,856.

While my invention is primarily intended for the drying of cordage fibers such as sisal and manila, it may be used for many other substances. Owing to the fact that these fibers originate in nature in the form of soft, pulpy leaves or stems, machinery for removing the pulp has been constructed in such a way that the leaves are fed crossways with such machines. The nature of the work done in removing the pulp is such that it is much more expedient to feed these fiber substances in this manner. I mean by this that the conveying chains which convey the fiber through the cleaning mechanism run longitudinally or lengthwise of the machine and the fiber is fed crossways of such conveyors, so that the revolving drum removing the pulp may more conveniently contact with the fiber. As a result of this practice, such fibers are delivered crossways or at right angles to their path of motion, and, as they emerge from the cleaning mechanism of the decorticator or cleaning machine, the butt end, which is stiff, protrudes from the right side of the conveying machine a short distance and the top or taper ends of such fibers are hanging down in a vertical plane on the other side of the conveyor chain of the mechanism. This makes it necessary for convenience and economy to handle these fibers crossways of their direction of motion.

Primarily, therefore, my invention is designed to take fiber fed crossways with the apron in the condition in which it comes from the decorticating mechanism. This delivery of the fiber substances makes it necessary that extreme control of air currents in the drier be possible. The butts in many cases being considerably thicker than the tops, and the fiber being of variable lengths, make it impossible to cover completely with the fiber substance, the conveyor apron which conveys the fiber substance through the drying mechanism.

It is obvious that in an air drier of this variety the air will seek free passage where the apron is not covered in preference to penetrating the fiber substance. It is also necessary in a drying machine of this kind that higher speeds be attained than are usual in such mechanisms. This is due to the fact that the drier is intended to receive fiber as fast as it is produced by the decorticating mechanism and, although it is possible to thicken the layer and thereby slow the drier chain without curtailing the production of the decorticator, there is a definite limit to the thickness of such a layer. When the layer of fiber on the conveyor is too thick, the pressure of the air against which the fan is working increases sharply and more power is required, and the drying is curtailed. In my invention it is my intention to feed a thin layer over a long length of conveyor at a relative high speed, and, by means of high temperatures, to curtail the time that the fiber is exposed to such drying temperature, or the time necessary for the fibers to travel through the drier. This necessitates devices to direct and control the flow of air through the drying mechanism and to control the temperature and moisture in the air of the drier, and to produce a conveying mechanism which offers little or no resistance to the passage of the air, but at the same time is capable of moving at relatively high speed without undue deterioration and repairs.

It is impossible to direct currents of air at velocities much under one thousand feet per minute, and, when air is delivered into a large chamber such as a drying tunnel, the velocity is immediately lowered, and swirls and cross currents are apt to ensue, unless means are provided to accurately direct the flow of air, and, in such a chamber where the conveying mechanism is only partially covered with the substance to be dried, it is difficult to keep the air from going through the open places in the conveyor and thus leaving the substance on the conveyor undried. My mechanism is what is usually termed a triple pass drum; that is, there are three separate conveyors in the mechanism and the fiber substances make three passages over the length of the drier cell or tunnel. The fiber substances enter over the top of the cell, traveling to the other end of the tunnel or cell, dropping onto a conveyor running in the opposite direction, returning to the end of the tunnel it started at, but at a lower height, then moving a third time the length of the tunnel on the third or bottom conveyor, from which it is conveyed out of the tunnel.

I will now describe my invention and then describe more minutely its operation.

Figure 1 is a side elevation of the drier;

Figure 2 is a plan view showing in more detail the damper mechanism;

Figure 3 is a cross sectional view of the drier;

Figure 3a shows the structure for fastening the panels to the framework;

Figure 4 shows the actuating devices in elevation;

Figure 5 shows the actuating devices in plan;

Figure 6 is an end elevation showing the mountings of the conveyor chains;

Figure 7 is a side elevation of the same;

Figure 8 is an illustration of the top and bottom louver deck for controlling the entrance of air into the drier, and its discharge from the same;

Figure 9 is a detail showing how the said damper or louver is set;

Figure 10 is a portion of the drier showing the boiler, steam connections, fan, heater, and air ducts, which plan shows the path of the air in traversing through the mechanism;

Figure 11 is an elevation of the fan, heating coils, and air ducts, showing their connection with the drying tunnel;

Figure 12 is an illustration of the louver controlling the air supply in the fresh air inlet;

Figure 13 is an illustration of a cross section of the fresh air inlet as seen along the line 13—13 in Figure 11;

Figure 14 shows the paneling of the housing of the tunnel;

Figure 15 shows in plan the construction of the drier conveyors;

Figure 16 is an elevation showing the path of the fiber in dropping from one chain to another;

Figure 17 shows the construction of the panel of the tunnel wall; and

Figure 18 illustrates how such panels are fitted into the steel structure to make an air tight construction.

The skeleton of the drier is preferably constructed of light structural steel, usually of T-iron, adapted to receive insulated panels. Numeral 1 shows the skeleton of the drier erected with vertical and horizontal members. In the side, tops and ends are inserted in between the T's (Figure 17) panels preferably made of wood covered with asbestos strips and covered with sheet iron, the hollow in the said panel being filled with insulating material such as rock wool or the like. Such panels fit into the space between the members as seen in Figure 1, and, when the panel is put in, the T is filled around with cementitious material and the panel drawn up by a batten strip. The vertical T's 2 have studs 3 welded to their stems. On these stems a nut 4 is provided. When the panels are placed in position (see Figure 18) and the cementitious material placed on the T, a batten strip is placed over the space between the panels, a suitable hole in the batten strip being provided for the welded stud to go therethrough. On top of the batten strip is a spacer plate or washer 5, so that the nut 4, on being screwed to the stud 3, exerts a pressure on the plate 5, which draws the batten strip tightly onto the panel, thereby securing the air tight joint. In this way, the housing of the drier cell or tunnel is built. On either end of the tunnel is provided a structure outside of the tunnel itself, which carries the three shafts mounting the sprockets that actuate the three conveyor chains. The drive mechanism is preferably at the rear end of the tunnel, and the driven mechanism at the front end of the tunnel, the panel walls being perforated where the shafts for the said conveying mechanism come through the panel wall.

In Figure 4, the numeral 6 designates a variable speed device driven by a motor. From the slow speed of this variable speed device is a chain 7 driving a sprocket 8, which actuates a counter-shaft 9 at the top of the drier tunnel. This counter-shaft 9 has a sprocket 10 mounted thereon actuating a chain 11, which in turn actuates a sprocket 12, said sprocket actuating the driving shaft of the top conveyor 13. This top conveyor is thus actuated by a chain 11 from the counter-shaft. The lower chain is actuated by chain 14, and on the rear shaft of the bottom conveyor is a gear 15 meshing with a gear 16 (Figure 6) on the rear driven shaft of the intermediate or middle conveyor. The middle conveyor, therefore, is actuated from the bottom conveyor. It will, therefore, be seen that the top and bottom chains are actuated by means of chains from the counter-shafts 12 and 14, and the middle conveyor is actuated from the bottom chain by the said gears. The mechanism, therefore, is driven from a motor from the variable speed device through a chain 7 to a sprocket 8, which actuates the counter-shaft 9, which in turn actuates a sprocket 10 on the counter-shaft and through the chain 11 actuates a sprocket 12 on the driven shaft of the top conveyor. In a like manner, the lower chain is actuated through the chain 14 and a sprocket 17 attached to the drive shaft of the lower conveyor.

The driven shafts on the three conveyors are mounted on the rear frame external to the drier cell or tunnel, as shown in Figures 16 and 7. The top chain driven shaft in front of the machine is journaled in take-up boxes 18. The middle or intermediate chain is provided with take-up boxes 19 situated at the rear of the machine and the rear driving shaft of the bottom conveyor is journaled in take-up boxes or bearings 20 on the rear of the machine. These take-up boxes take up slack occasioned from the wear of the chains.

It can now be seen that the material to be dried is delivered at the front of the machine on top of the top conveyor belt and passes horizontally through the drier tunnel to the rear end of the chain. The chain is then returned around a sprocket on a shaft driven by chain 11 and sprocket 12 and returns on an angle bar which serves as a track to support the return of a portion of the chain. At this point there is provided a shield or guide plate 21 similar to that shown in Figure 16, and, as the fiber drops from the top of the top chain, it is guided to the top of the middle chain. From thence it is carried to the front end of the drier from the rear end and in a like manner is dropped upon the top portion of the lower chain and from thence carried through the drier tunnel from the rear end of the machine and is delivered at a point external to the drier at the rear end of the machine, from whence it is taken to a baling press, not shown.

The construction of these chains is unique for the reason that the fiber, contrary to the usual custom, is fed crossways with the conveyor. The conveyor chains 22 (Figure 15) are formed of any standard roller type of chain with standard attachment links every other link. These links have a boss 22$^a$ on the inside of the chain on which is swiveled a projection, not shown, adapted to enter the end of cross pipes 23, said pipes being usually of standard 1 inch steam pipe. The cross pipes 23 are thus supported at either end by the swiveled projection of the standard attachment link of the chain 22. Every 3 inches, or thereabouts, are holes drilled through the pipes, about double the diameter of the conveyor, said holes lying in longitudinal, parallel lines through the pipes. Through said holes are threaded flexible metal wires about one-half the diameter of the holes. These wires run the whole length of the conveyors and have adjoining ends spliced together to form endless cables 24 following the path of the conveyor chain and supported in the said cross pipes. In this way a conveyor is formed which offers negligible opposition to the flow of air through the chains and is at the same time capable of performing under higher speeds than the usual chains of driers in this class of mechanism. As the drier forms a unit in an assembly of machines, this speed is quite essential to the successful automatic operation of the several devices linked together. At the same time, it is economical and, as stated, offers a minimum resistance to the passage of air. The drier cell, therefore, exclusive of the mechanism for controlling the flow of the air, consists of an enclosed chamber with three chains, one over the other, running the full length of the tunnel, and spaced throughout the length are the supporting cables 24 for carrying the fiber or similar substances through the drying tunnel.

The drying tunnel (Figure 3) consists essentially in a top air duct for conveying and distributing the air throughout the length and breadth of the drying tunnel. A louver deck is so constructed that it may be regulated so as to force the air to enter the drier proper equally distributed. This louver deck (Figure 8) is composed of sections built on an angle iron frame supported by the upright members of the steel skeleton of the drier tunnel. On this angle iron frame are strips of sheet metal over the whole face of the frame, with spaces between each of these steel strips or plates 25. On top of these fixed plates or strips are located movable plates 26 attached to the fixed or lower plate 25 by means of a bolt or stud. These said movable plates 26 have slotted holes (see also Figure 9), the stud or bolt being threaded and passing through the movable plate 26, and consequently may be shoved forward or backward to open or close the orifices between the fixed plates and are held in such fixed position by winged nuts 27, these sections forming the top and bottom louver decks, as shown in Figure 3, the top louver deck being numbered 28, and the lower deck being numbered 29. By these decks, more or less air may be forced to go different places along the length of the drier, or laterally by the same regulation. In this way, air preferably enters the drier evenly distributed throughout the length and breadth of the tunnel. At the same time, the louver deck 29 causes an equal distribution of air leaving the tunnel. When the air enters the drying tunnel through the louver deck 28, it is preferably at a velocity of between 1000 and 1500 feet per minute where it impinges on the layer of fiber on the top conveyor. After passing the layer of the fiber on the top conveyor, the air expands and the velocity of the air naturally drops. In order that it may be properly directed and the velocity of the air rehabilitated, two more decks 30 and 31 are provided in the drier for the purpose of rehabilitating the velocity of the air and directing it onto the fiber distributed on the top of the middle and bottom chains.

These decks 30 and 31 have a unique construction and, as illustrated in Figure 2, are formed of sheet metal perforated usually with holes about two inches in diameter. The number of these holes are so calculated as to maintain the velocity of the air between 1000 and 1500 feet per minute on leaving the deck. I have denominated these decks as perforated decks. The perforated sheet metal is attached to angle iron frames built in sections, which, like the louver decks, are supported by the frame work of the tunnel and form a continuous perforated deck immediately above the top of the middle conveyor and immediately above the top of the lower conveyor. On the left of these plates are two strips of perforated plates, perforated in exactly the same manner as the fixed plates 32. The holes in the sliding plates 33 register with the holes in the fixed plates of this deck. These plates are usually about one foot wide each, but may be made narrower or wider as desired, according to the material handled in the drying mechanism. These sliding plates 33 are connected by suitable means 33ª, such as bolts or rivets, and form a continuous strip throughout the length of the drier. It will, therefore, be seen from this description that a movement of two inches on the sliding plate will close all the holes in the fixed plates underneath it. On one end of these sliding plates are riveted angle irons 34, and to these angle irons on each plate are attached two springs 35, sufficiently powerful to draw the plate back when the tension is released, the other end of the said spring being attached to the frame of the drier in any suitable manner. At the other end of these sliding damper plates 33 are two other angles 36 riveted to the said strips, and to these angle irons are attached strong, flexible cables 37 which pass over pulleys 38 and then to a threaded rod 39, (see Figure 2). On the outside of the drier wall are two plates 40 drilled to allow for the passage of the said threaded rods. The threaded rods are preferably flattened on top, and a corresponding flat place in the hole in these plates is provided to prevent the said rods from turning. On these threaded rods are hand wheels 41, which are threaded and screwed onto the said rods. It will, therefore, be seen that, when these hand wheels are turned, a tension is exerted by forcing the rods to move outwardly and thence to the cables to the dampers, thus pulling the dampers forward and shutting off the holes in the fixed plates of this deck under the damper plates to the extent that the damper plates are moved forward. Conversely, when these hand wheels are unscrewed, the springs at the other ends of the damper plates draw the damper plates backward, thus opening the holes in the lower plates. It will be seen from this description that, when fiber, such as sisal, manila and the like, is handled, there is a tapering of the fiber off from the right hand side of the drier toward the left hand, and, as the fibers vary in the length, there will be thin and open places under these dampers. When the drier is being operated with shorter fibers, these dampers are closed more or less, as the case requires, and the dampers are so adjusted as to force an equitable distribution of the air laterally of the drier. In this way, sufficient air is forced to the right side of the drier to dry the heavier portions of the fiber layer and also prevents undue amounts of air from escaping through the open or thin places of the fiber layer at the left hand side of the drier. By means of these louver decks and perforated decks, the path of the air in the drier is controlled and directed so that an even drying effect is obtained on the three layers of fiber passing through the drier.

On the outside and auxiliary to the drier is a steam boiler or source of heat. This steam is conveyed by means of pipes or otherwise from the heating boiler 41' (Figure 10), through the pipes 42 to heater coils 43, and thence back to the boiler. The air enters the system through a fresh air opening 44. This fresh air opening is provided with a louver 45, which is automatically controlled. This louver is preferably situated directly in front of the opening to the fan. The air is then forced from this fan located in the housing 46 through the heating coils 43 after it has passed through the entrance duct 47, which conducts the heated air into the top of the drier chamber 48 midway between its ends, which serves as a distributing duct. From thence the air passes down, as previously described, through the several decks and several layers of fiber into a lower chamber 49 and thence out through a conductor pipe 50. In the said duct 50 is a riser 51, which is a duct for conveying the moist air discharging to the outside air. Immediately beyond this riser is a louver comprising swinging damper plates 52, which are manually set to restrict the orifice of the return duct, thereby creating a pressure which serves to discharge more or less air through the moist air discharge 51 according to the regulation of the said louver 52. (See Figures 11 and 13.) From there the air not discharged through the riser 51 returns to the fan and is recirculated.

The fan, not shown, may be actuated by a motor 53 through a belt or chain 54. It will, therefore, be seen that the air is forced to circulate through the fan, thence through the duct and heater horizontally into the top chamber 48 of the drier. Inside of this chamber are two baffling or direction plates 55, which cause the air to turn at right angles from the middle and proceed toward either end of the drier, from whence it is distributed through the slotted plate louver previously described, vertically through the drier cell, and thence, by means of the lower chamber 49, to the return duct 50, and partially discharged through the riser 51, the balance of the air returning to the fan. The air which is lost or allowed to escape through the riser 51 is compensated for through fresh air supplies taken in through the fresh air louver 45.

In the entrance duct at the top of the drier is situated the dry bulb 56 of the recording, controlling cyclometer 57, which is usually of the vapor capsule form, said instrument being the well known standard instrument used in this class of apparatus. Likewise, the wet bulb 58 of said instrument is preferably located below this in the return duct 50 soon after it leaves the lower chamber of the drier 49. Such instruments are provided with two sets of hands, one set regulating the wet and dry bulb temperatures, and the other set being set hands by which the desired wet and dry bulb temperatures are controlled. It is, therefore, only necessary to set the setting hands at the points determined empirically where the instrument generally takes range and it will automatically regulate the wet and dry bulb temperatures of the air. The controlling cyclometer is well known in standard mechanism for valve and damper control. The dry bulb is attached to the steam valve 59 of the heating coil 43, and the wet bulb control is attached to the fresh air louver 45. A valve 60 is interposed in either a steam or air line leading to a pressure controller 61 which automatically sets the air louver 45 through the action of the links 62.

Having now described the mechanism of the drier, I will indicate its operation.

As fiber is fed onto the top of the top conveyor, the conveyors are in continuous motion, and, as it proceeds rearward of the drier tunnel, the air becomes more moist, due to contact with the wet fiber. The air proceeds through the several layers of fiber, getting more moist continually, when it emerges from the drier, as previously described, and is there circulated through the fan and heater as above described. This recirculation continues until the air has obtained the necessary moisture to affect the wet bulb control, which is set by the setting hand of the cyclometer. When this point is reached, the wet bulb control opens the fresh air louver and admits dry air, which, mixing with the wet air, lowers the moisture content of the latter. When this fresh air has sufficiently lowered the moisture content to the limit provided by the setting hand of the instrument, the louver is automatically closed, and the air continues immediately to get more moist. In this way, the moisture in the entire system is regulated and controlled and held at the desired point. In a like manner, the air is heated by the coil, which has sufficient heating capacity to provide the temperature desired under the different conditions met with in operating the drier. Should the air become hotter than that required by the set of the instrument, the dry bulb control immediately closes the steam valve controlling the steam entering the coils and the temperature immediately tends to drop. When it drops below the range provided by the set of the dry bulb control, the valve is again opened and in this manner the temperature of the air is controlled in the drier. It is desirable always to leave a certain amount of moisture in the material to be dried, otherwise, the quality of the material is impaired. This final moisture content left in the material on delivery from the drier varies with different materials and the uses to which it is put. It is necessary to ascertain empirically what moisture content gives the best results, when reference to the record made by the instrument indicates the position of the setting hands. In a like manner, there is a limit to the temperature which can be used in drying most materials without impairing their qualities. It is desirable to use the maximum temperature consistent with the quality of the material, for reasons of economy. The higher the temperature of the air, the sooner the material will dry, and the greater capacity the air has for moisture.

While I have shown a three pass drier, I do not confine myself to this construction, but it is essential at all times that the velocity of the air and the proper distribution of the air be maintained. If more passages of air are desired, it is necessary to provide an additional perforated or damper deck for each layer or conveyor. In this construction of the drier we are, therefore, able to receive a continuous supply of material which may not be evenly spread and may vary in length and prevent undue passages of air through the thin and open spaces on the several conveyors. By a regulated supply of air, I mean an adequate supply of air, the temperature and moisture content of which is maintained at a predetermined figure, and by a distributed air, I mean air that is forced to take a path suitable for obtaining the best drying effect.

Having now described my invention, what I claim as new is:

1. In a drier, the combination comprising a housing enclosing a longitudinally moving apron conveyor for moving fibers lying crosswise thereon, a stationary perforate deck disposed horizontally above the conveyor and extending throughout the length and breadth of the housing, a movable perforate damper plate lying longitudinally on the deck and along one side of the longitudinal median line of the deck, means normally holding the plate to cause its perforations to register with the deck perforations, and means for moving the plate and setting it in a position to damp the deck perforations.

2. In a drier, the combination comprising a housing enclosing a longitudinally moving apron conveyor for moving fibers lying crosswise thereon, a stationary perforate deck disposed horizontally above the conveyor and extending throughout the length and breadth of the housing, a plurality of movable perforate damper plates lying longitudinally on the deck and along one side of the longitudinal median line of the deck, means normally holding the plates to cause their perforations to register with the deck perforations, and means for independently moving any plate and setting it to damp the deck perforations.

3. In a drier, an elongated drying tunnel, a hot air supply therefor including a fan, a bank of longitudinally extending, horizontally disposed, open-work conveyors in the tunnel adapted to convey material to be dried, means for directing the material from one conveyor to the next and so on over all of said conveyors, means for distributing the hot air throughout the length and breadth of the tunnel, horizontal perforate damper decks arranged in the tunnel over each conveyor, said decks extending throughout the length and breadth of the tunnel, perforate slidable damper plates arranged longitudinally above the decks along and adjacent one side of the tunnel for regulating the lateral dispersion of air successively through the decks and conveyors, means for returning the air thus passed to the fan, and control mechanism for maintaining the temperature and moisture content of the air at predetermined degrees.

4. In a drier, an elongated drying tunnel, a hot air supply therefor including a fan, a plurality of horizontally disposed, endless, open-work conveyors arranged longitudinally in the tunnel and spaced one above the other, said conveyors adapted to carry loose material and to pass the same a plurality of times through the tunnel, means for directing the material from one conveyor to the next and so on in turn over all of said conveyors, means for distributing the hot air throughout the length and breadth of the tunnel, a perforate damper deck arranged horizontally above each conveyor, each said deck extending throughout the length and breadth of the tunnel, slidable damper plates arranged longitudinally on the decks along one side of the longitudinal median line of the tunnel, and means for operating said plates to regulate the lateral dispersion of the air successively through the decks and conveyors.

In testimony whereof I affix my signature.

BERTRAND S. SUMMERS.